US 11,718,211 B2

(12) United States Patent
Hashimoto et al.

(10) Patent No.: US 11,718,211 B2
(45) Date of Patent: Aug. 8, 2023

(54) VEHICLE SEAT

(71) Applicant: TACHI-S CO., LTD., Tokyo (JP)

(72) Inventors: Shuhei Hashimoto, Tokyo (JP); Kenji Sato, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 17/349,403

(22) Filed: Jun. 16, 2021

(65) Prior Publication Data

US 2021/0394655 A1 Dec. 23, 2021

(30) Foreign Application Priority Data

Jun. 22, 2020 (JP) .................. 2020-107180

(51) Int. Cl.
| | |
|---|---|
| *B60R 16/02* | (2006.01) |
| *B60N 2/60* | (2006.01) |
| *B60N 2/70* | (2006.01) |
| *B60N 2/68* | (2006.01) |

(52) U.S. Cl.
CPC ............. *B60N 2/68* (2013.01); *B60N 2/6045* (2013.01); *B60N 2/7035* (2013.01); *B60R 16/0215* (2013.01)

(58) Field of Classification Search
CPC ............. B60R 16/0215; B60N 2/6045; B60N 2/6036; B60N 2/7047
See application file for complete search history.

(56) References Cited

U.S. PATENT DOCUMENTS

| | | | | |
|---|---|---|---|---|
| 2013/0127215 | A1* | 5/2013 | Dumont | B60N 2/809 174/72 A |
| 2014/0159447 | A1* | 6/2014 | Saitou | B60R 16/0215 297/217.3 |
| 2017/0174153 | A1* | 6/2017 | Line | B60N 2/6009 |
| 2018/0272905 | A1* | 9/2018 | Ruff | B60N 2/70 |
| 2019/0084503 | A1* | 3/2019 | Kajihara | B60R 16/0215 |
| 2019/0143913 | A1* | 5/2019 | Jones | B60R 16/0215 297/217.3 |
| 2021/0268972 | A1* | 9/2021 | Yamamoto | B60R 16/0215 |

FOREIGN PATENT DOCUMENTS

| | | | | | |
|---|---|---|---|---|---|
| CN | 102077430 | A | * | 5/2011 | ......... B60R 16/0215 |
| CN | 105197161 | A | * | 12/2015 | ............... B62J 1/00 |
| FR | 3106789 | A1 | * | 8/2021 | |
| JP | 2012-040901 | A | | 3/2012 | |
| JP | 2014-125188 | A | | 7/2014 | |
| JP | 2014230339 | A | * | 12/2014 | |
| JP | 2015074365 | A | * | 4/2015 | |
| JP | 2016-068779 | A | | 5/2016 | |
| JP | 2016068780 | A | * | 5/2016 | |
| JP | 2019123298 | A | * | 7/2019 | ............... B60N 2/22 |
| WO | WO-2015033766 | A1 | * | 3/2015 | ............... B60N 2/02 |

* cited by examiner

*Primary Examiner* — Timothy J Brindley
(74) *Attorney, Agent, or Firm* — Paratus Law Group, PLLC

(57) ABSTRACT

A vehicle seat on which an occupant of a vehicle is seated, includes: a cover covering a seat frame, a wire harness routed inside the cover, and a flexible wrapping member attached to the seat frame and wrapping a part of the wire harness.

6 Claims, 14 Drawing Sheets

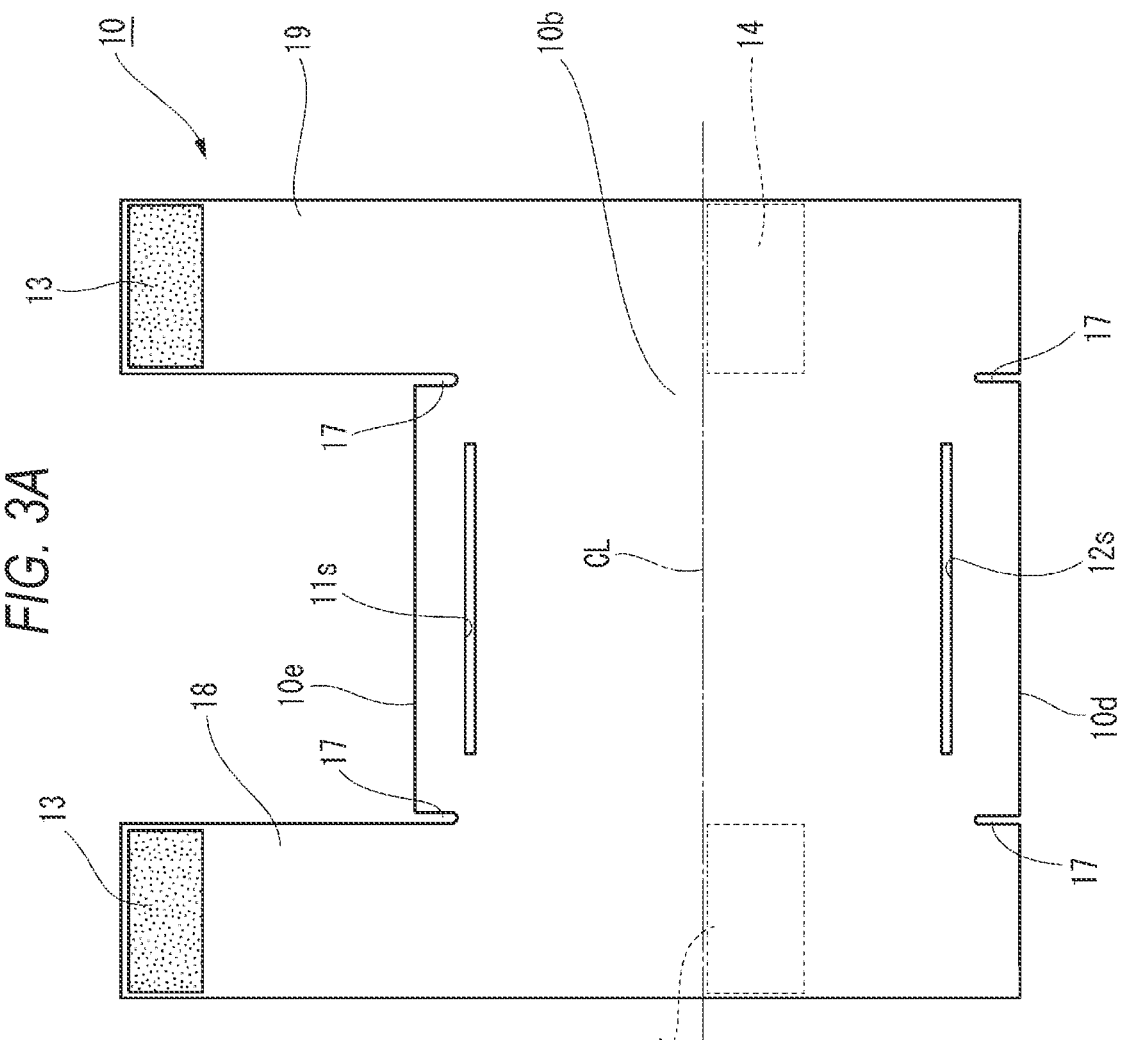
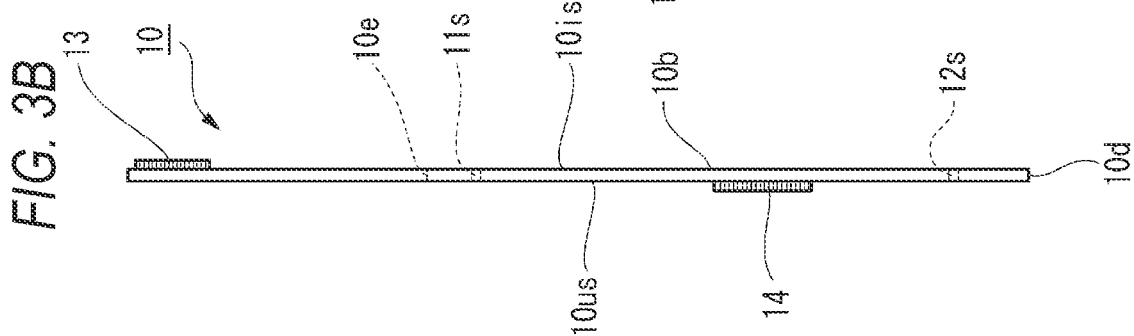

VEHICLE SEAT

CROSS REFERENCE TO RELATED APPLICATIONS

This application claims priority to Japanese Patent Application No. 2020-107180 filed on Jun. 22, 2020, the content of which is incorporated herein by reference.

TECHNICAL FIELD

The present invention relates to a vehicle seat that holds a posture of a seated person.

BACKGROUND ART

There is known a structure that holds wiring such as a wire harness in a vehicle seat that is mounted in a vehicle such as an automobile and that holds a posture of a seated person (for example, with reference to JP 2016-68779 A, JP 2012-40901 A, and JP 2014-125188 A).

JP 2016-68779 A discloses a vehicle seat in which an exposed portion of a cable is wrapped by a wrapping cover to prevent deterioration in appearance.

JP 2012-40901 A discloses a vehicle seat in which a wire harness exposed to the outside is covered and held by a cover member made of cloth.

JP 2014-125188 A discloses a vehicle seat in which a wire harness inside a seat back of the seat is fixed to a backboard by a clip made of resin.

In a structure in which a wire harness is fixed inside a seat by using a member having high rigidity as in JP 2014-125188 A, it may be difficult to satisfy a safety standard related to an internal protrusion. In addition, the wire harness may be damaged during fixing of the wire harness. Further, it is necessary to manufacture a fixing member matching a shape of the wire harness. For these reasons, the manufacturing cost of the seat increases. JP 2016-68779 A and JP 2012-40901 A aim to improve the appearance quality of the seat, and holding of the wire harness or the like inside the seat is not considered.

An object of the present invention is to provide a vehicle seat capable of lowering the manufacturing cost.

SUMMARY OF INVENTION

A vehicle seat according to an aspect of the present invention on which an occupant of a vehicle is seated, includes: a cover covering a seat frame, a wire harness routed inside the cover, and a flexible wrapping member attached to the seat frame and wrapping a part of the wire harness.

BRIEF DESCRIPTION OF DRAWINGS

FIG. 3A is a view showing a wrapping member shown in FIG. 2 in a deployed state, and FIG. 3B is a side view of the wrapping member shown in FIG. 2 in the deployed state.

DESCRIPTION OF EMBODIMENTS

Figure 1:
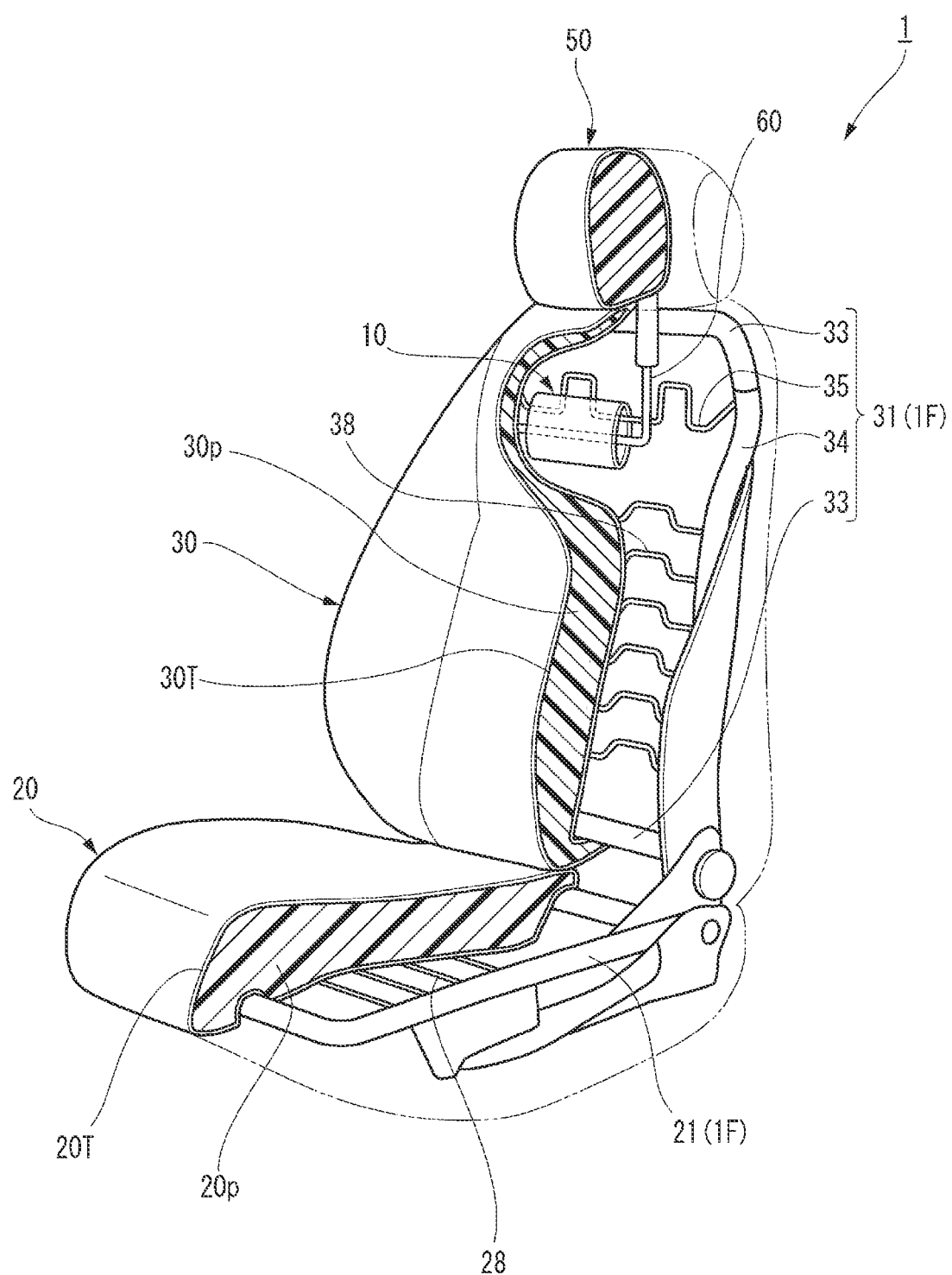
FIG. 1 is a partially cutaway schematic perspective view showing a schematic configuration of an automobile seat that is an embodiment of a vehicle seat of the present invention.
Figure 2:
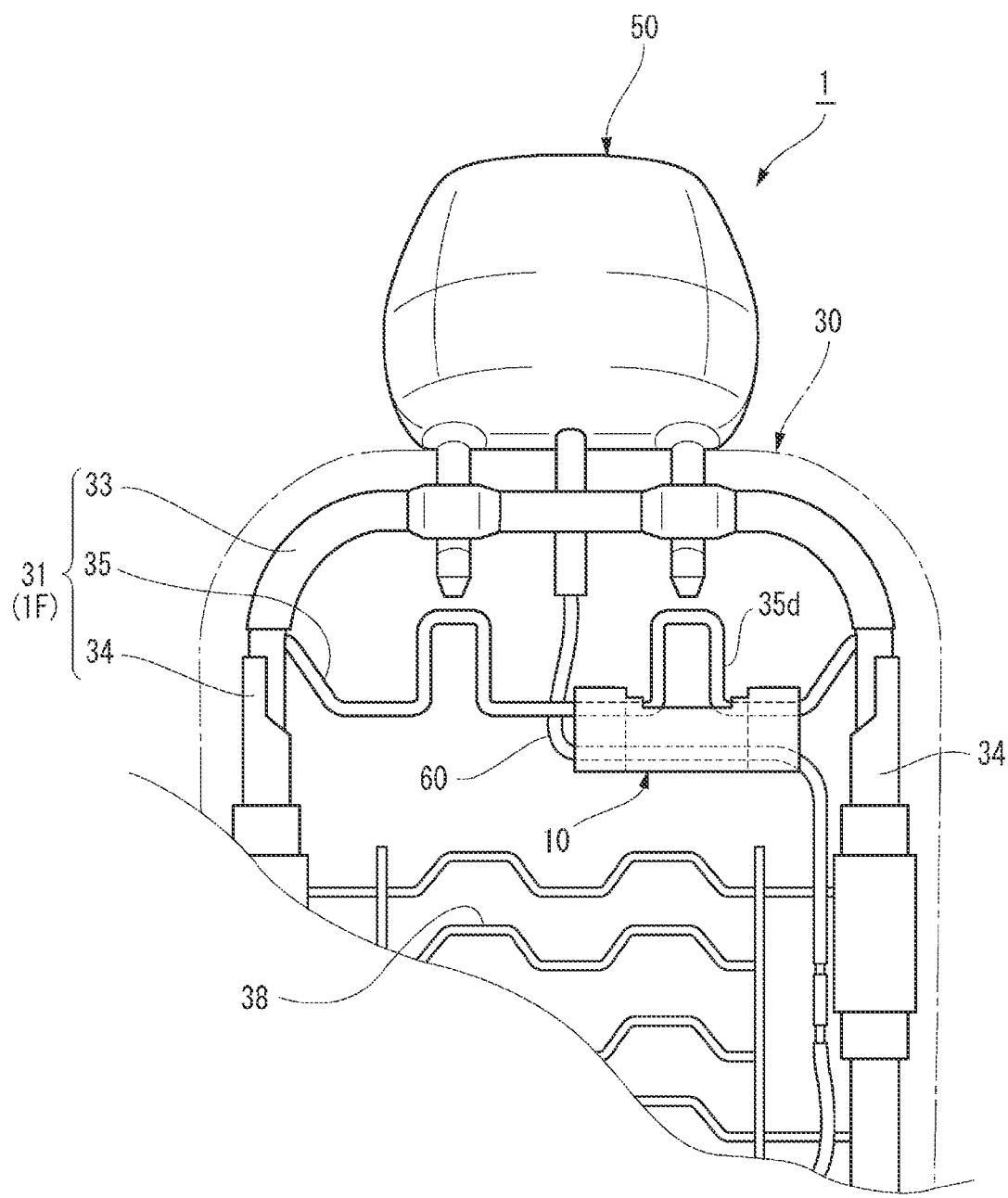
FIG. 2 is a rear view of an essential portion of an internal structure of the automobile seat shown in FIG. 1 as viewed from a seat rear side.

FIG. 1 is a partially cutaway schematic perspective view showing a schematic configuration of an automobile seat 1 that is an embodiment of a vehicle seat of the present invention. FIG. 2 is a rear view of an essential portion of an internal structure of the automobile seat 1 as viewed from a seat rear side.

In the following description about orientations, a front direction is referred to as a front side and a rear direction is referred to as a rear side when viewed from an occupant seated on the automobile seat 1 in a normal posture, and the front direction and the rear direction are collectively referred to as a front-rear direction. Directions (a right direction and a left direction of the occupant) orthogonal to the front-rear direction are referred to as a left-right direction. Further, a direction from a headrest side to a lower side in a direction perpendicular to the front-rear direction and the left-right direction is referred to as a lower direction, an opposite direction of the lower direction is referred to as an upper direction, and the upper direction and the lower direction are collectively referred to as an upper-lower direction.

As shown in FIG. 1, the automobile seat 1 is a front seat that is disposed on a front side of the automobile and can be seated by one occupant. The automobile seat 1 is fixed to a body (main body) of a vehicle, and includes a seat cushion 20 that supports buttocks and thighs of a user (an occupant of an automobile on which the automobile seat 1 is mounted) seated in a normal posture, a seat back 30 that supports a waist and a back of an occupant seated in a normal posture, and a headrest 50 that supports a head of an occupant seated in a normal posture.

The seat cushion 20 includes a cushion frame 21 that forms a framework (base) of the seat cushion 20 and is made of metal or the like. The cushion frame 21 is entirely covered by a cushion pad 20p made of a relatively soft resin foam material such as urethane foam. A trim cover 20T is attached to the cushion pad 20p and the cushion frame 21 so as to cover thereon. That is, the trim cover 20T constitutes an outer surface of the seat cushion 20 as a part of the seat cushion 20. Further, the cushion frame 21 is provided with seat springs 28 and the like for supporting the cushion pad 20p.

The seat back 30 includes a seat back frame 31 that forms a framework of the seat back 30 and is made of metal or the like. The seat back frame 31 includes, for example, a plurality of members. Specifically, the seat back frame 31 includes a pair of left and right side frames 34 (with reference to FIG. 2) that extend in the upper-lower direction with an interval in the left-right direction, a pair of upper and lower pipe frames 33 that connect upper ends and lower ends of the pair of side frames 34 to each other, and a sub-frame 35 that is disposed so as to be bridged in the left-right direction between the left and right side frames 34.

The seat back frame 31 is entirely covered by a cushion pad 30p made of a relatively soft resin foam material such as urethane foam. A trim cover 30T is attached to the cushion pad 30p and the seat back frame 31 so as to cover thereon. That is, the trim cover 30T constitutes an outer surface of the seat back 30 as a part of the seat back 30.

Each of the trim cover 20T and the trim cover 30T is a bag-shaped cover formed by sewing a plurality of cover members together. As the cover member, for example, leather (natural leather, synthetic leather) or fabric (woven fabric, knitted fabric, unwoven fabric) is used. The cover member may have a single-layer structure of leather or fabric, or may have a multilayer structure in which leather or fabric is used as a surface material and wadding (for example, resin foam such as elastically deformable flexible polyurethane foam) is laminated on the leather or fabric.

As shown in FIG. 2, in the seat back frame 31, a plurality of metal back springs 38 extend in the left-right direction of the seat back 30 in a region defined by the left and right side frames 34 and the upper and lower pipe frames 33. The back springs 38 and the like disposed inside the seat back frame 31 are covered together with the seat back frame 31 by the trim cover 30T.

For example, electric devices such as a monitor and an internal speaker that are visible from the seat rear side are incorporated in the headrest 50. As wiring of the electric devices, as shown in FIGS. 1 and 2, a wire harness 60 extends downward from the headrest 50 and is routed through the seat back 30. The wire harness 60 is disposed inside the trim cover 30T so as to be invisible from the outside. In the example of FIG. 2, the wire harness 60 enters the seat back 30 from, for example, a front side of the upper pipe frame 33, is attached along the sub-frame 35 extending in the left-right direction and along the right side frame 34, and then is routed downward along the right side frame 34.

The sub-frame 35 of the seat back frame 31 is disposed in a space between the cushion pad 30p and the trim cover 30T that covers the seat rear side. The wire harness 60 is held by a wrapping member 10 attached to the sub-frame 35.

The cushion frame 21, the seat back frame 31, auxiliary frames for complementing frame strength thereof are collectively referred to as a seat frame 1F.

As to be described later, the wrapping member 10 is configured by a flexible member that can be locked to the sub-frame 35, and as shown in FIGS. 1 and 2, the wrapping member 10 is configured to wrap (wrap so as to cover) the wire harness 60. A material of the wrapping member 10 is not particularly limited as long as the material has flexibility instead of high rigidity. For example, various materials such as cloth, synthetic leather, flexible synthetic resin, and a structure in which synthetic resin and cloth are bonded together can be used.

Figure 4:
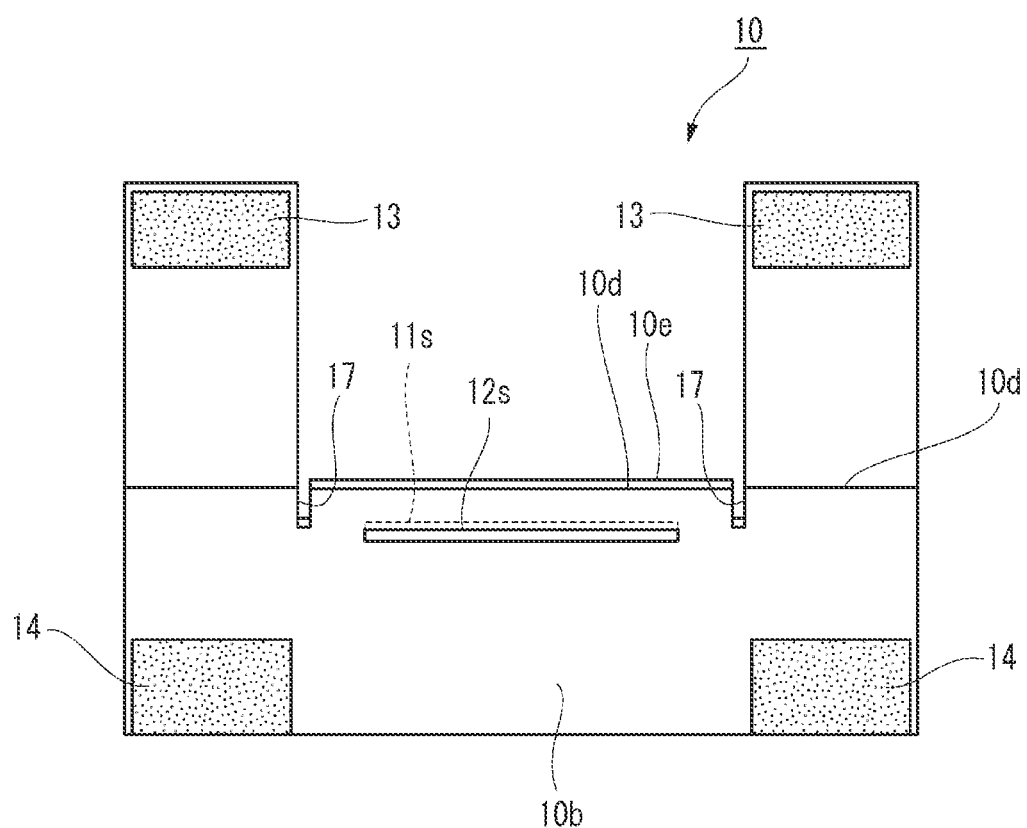
FIG. 4 is a plan view showing a folded state of the wrapping member shown in FIG. 2 when the wrapping member is to be attached.

Hereinafter, the wrapping member 10 will be described in detail with reference to FIGS. 3 and 4. FIGS. 3A and 3B are views of the wrapping member 10 in a deployed state. FIG. 3A is a plan view of the wrapping member 10 in a deployed state. FIG. 3B is a side view of the wrapping member 10 in the deployed state. FIG. 4 is a plan view showing a folded state (bent state) when the wrapping member 10 is to be attached to the sub-frame 35. A to-be-described upper-lower direction of the wrapping member 10 in the deployed state shown in FIG. 3A is the same with the upper-lower direction described above in a state where the wrapping member 10 is locked to the sub-frame 35. Further, a left-right direction of the wrapping member 10 in the deployed state shown in FIG. 3A is the same with the left-right direction described above in a state where the wrapping member 10 is attached to the sub-frame 35.

As shown in FIGS. 3A and 3B, the wrapping member 10 is a sheet-shaped member. The wrapping member 10 has an appearance shape including a substantially rectangular main body portion 10b, a first extending portion 18, and a second extending portion 19. The first extending portion 18 is a rectangular portion extending from a left side of an upper end 10e of the main body portion 10b. The second extending portion 19 is a rectangular portion extending from a right side of the upper end 10e of the main body portion 10b.

A pair of an upper first slit 11s and a lower second slit 12s extending in parallel in the left-right direction are formed in the main body portion 10b. The first slit 11s is formed between the first extending portion 18 and the second extending portion 19 that are on an upper end 10e side of the main body portion 10b and extends in parallel with the upper end 10e. The second slit 12s is formed in an end on a lower end 10d side of the main body portion 10b and has the same length as the first slit 11s along the lower end 10d.

The first slit 11s and the second slit 12s are provided at symmetrical positions with respect to a center line CL in the upper-lower direction of the main body portion 10b. That is, the first slit 11s and the second slit 12s are configured to overlap each other when the main body portion 10b is folded (bent) at a position of the center line CL (with reference to FIG. 4).

Cuts 17 are formed respectively at a boundary position between the upper end 10e of the main body portion 10b and the first extending portion 18 and a boundary position between the upper end 10e of the main body portion 10b and the second extending portion 19. The cuts 17 are formed as extension line edges of both inner side edges of the first extending portion 18 and the second extending portion 19, and ends of the cuts are close to left and right ends of the first slit 11s. Further, in the lower end 10d of the main body portion 10b, the same cuts 17 are also formed on both left and right end sides of the second slit 12s at the same positions as in the upper end 10e.

The wrapping member 10 is provided with locking portions 13 and locking portions 14 for locking both left and right ends of the main body portion 10b when the wire harness 60 is wrapped by the main body portion 10b. The locking portions 13 are provided on two tip ends of the first extending portion 18 and the second extending portion 19, respectively. The locking portion 13 is provided, for example, as a hook-and-loop fastener on an inner surface 10is which is on an inner side of the wrapping member 10 in an attached state of the wrapping member 10 shown in FIGS. 1 and 2. The locking portion 14 corresponding to the locking portion 13 is provided as a hook-and-loop fastener, which is to be engaged with the locking portion 13, on an outer surface 10us which is on an outer side of the wrapping member 10 in the attached state of the wrapping member 10.

A position of the locking portion 14 provided on the outer surface 10us is appropriately set in consideration of extending lengths of the first extending portion 18 and the second extending portion 19. In the present embodiment, the position of the locking portion 14 is set such that the locking portion 14 is positioned on a front side (a side where the locking portion 14 is visible in FIG. 4) when the wrapping member 10 is bent so as to fold the main body portion 10b at the center line CL as shown in FIG. 4. In other words, the locking portion 14 is provided on the outer surface 10us on a second slit 12s side with respect to the center line CL in the main body portion 10b. In this way, when the main body portion 10b is in the folded state, the locking portion 14 comes to a position visible on the front side, and thus locking operability between the locking portion 13 and the locking portion 14 is improved.

Hereinafter, attachment of the wrapping member 10 to the sub-frame 35 and routing of the wire harness 60 will be described in detail with reference to FIGS. 5 to 9.

Figure 5:
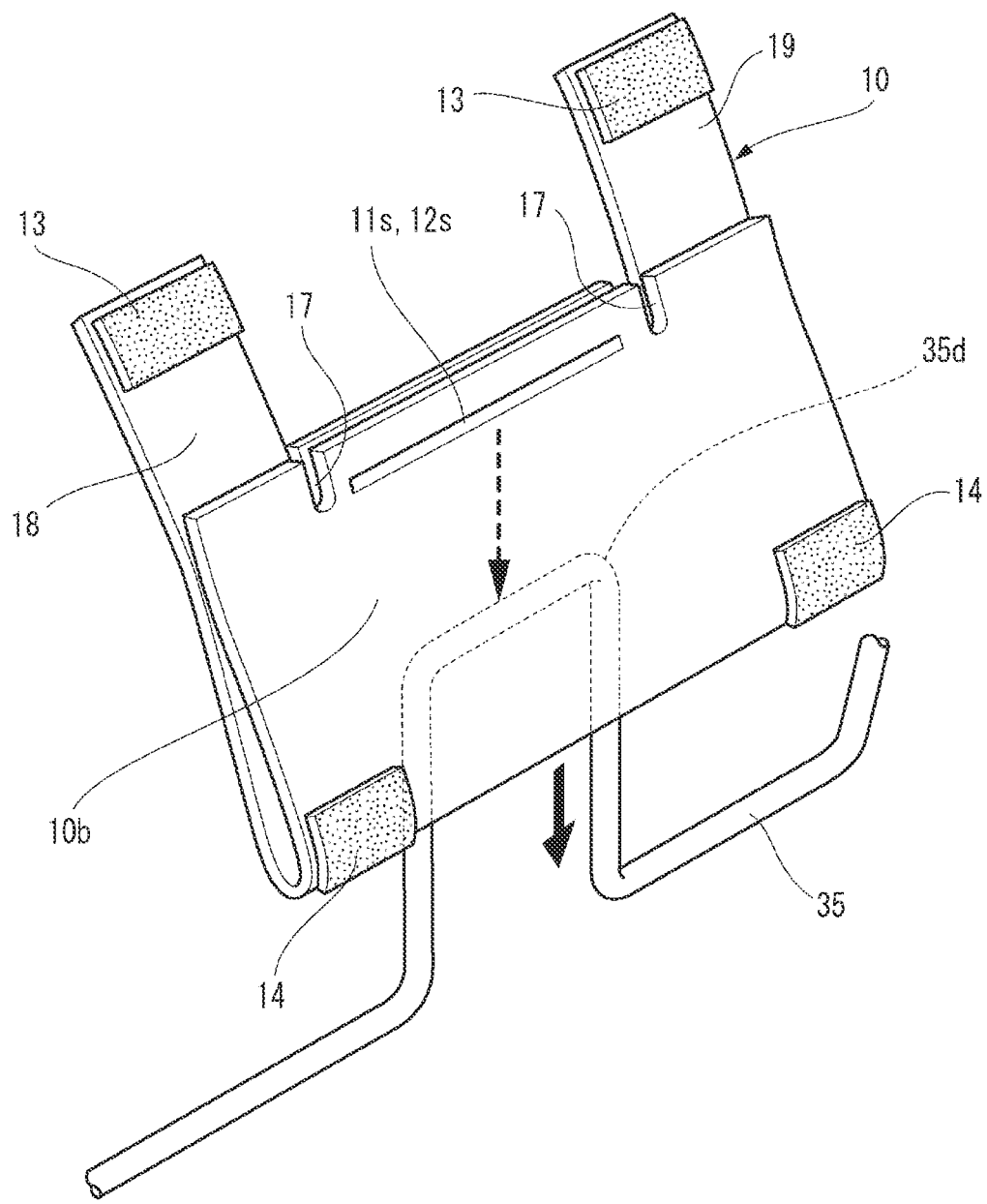
FIG. 5 is a perspective view when the wrapping member is to be attached to a sub-frame in the folded state shown in FIG. 4.
Figure 6:
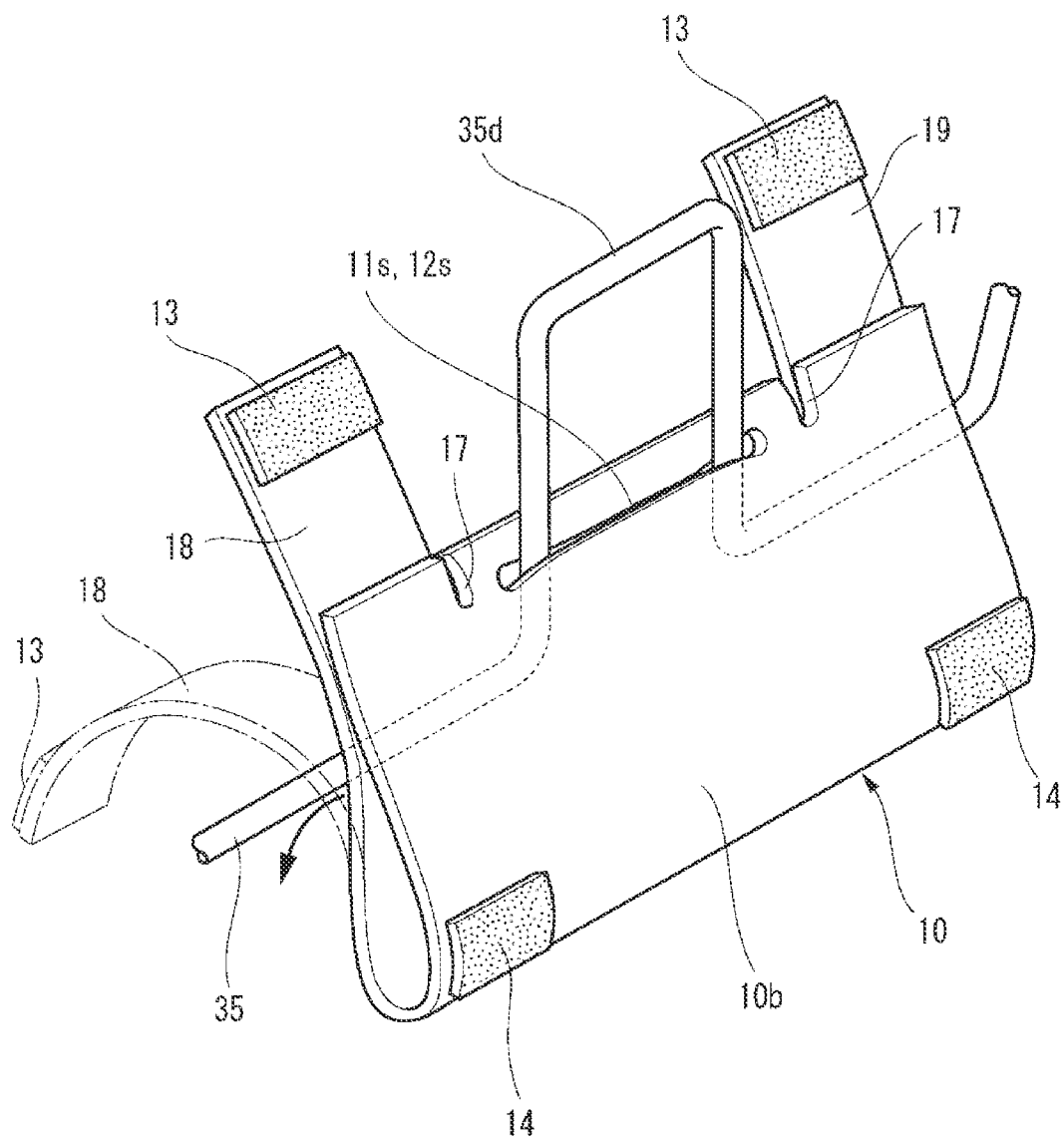
FIG. 6 is a perspective view showing a state where the wrapping member is held on a penetrating portion of the sub-frame.
Figure 7:
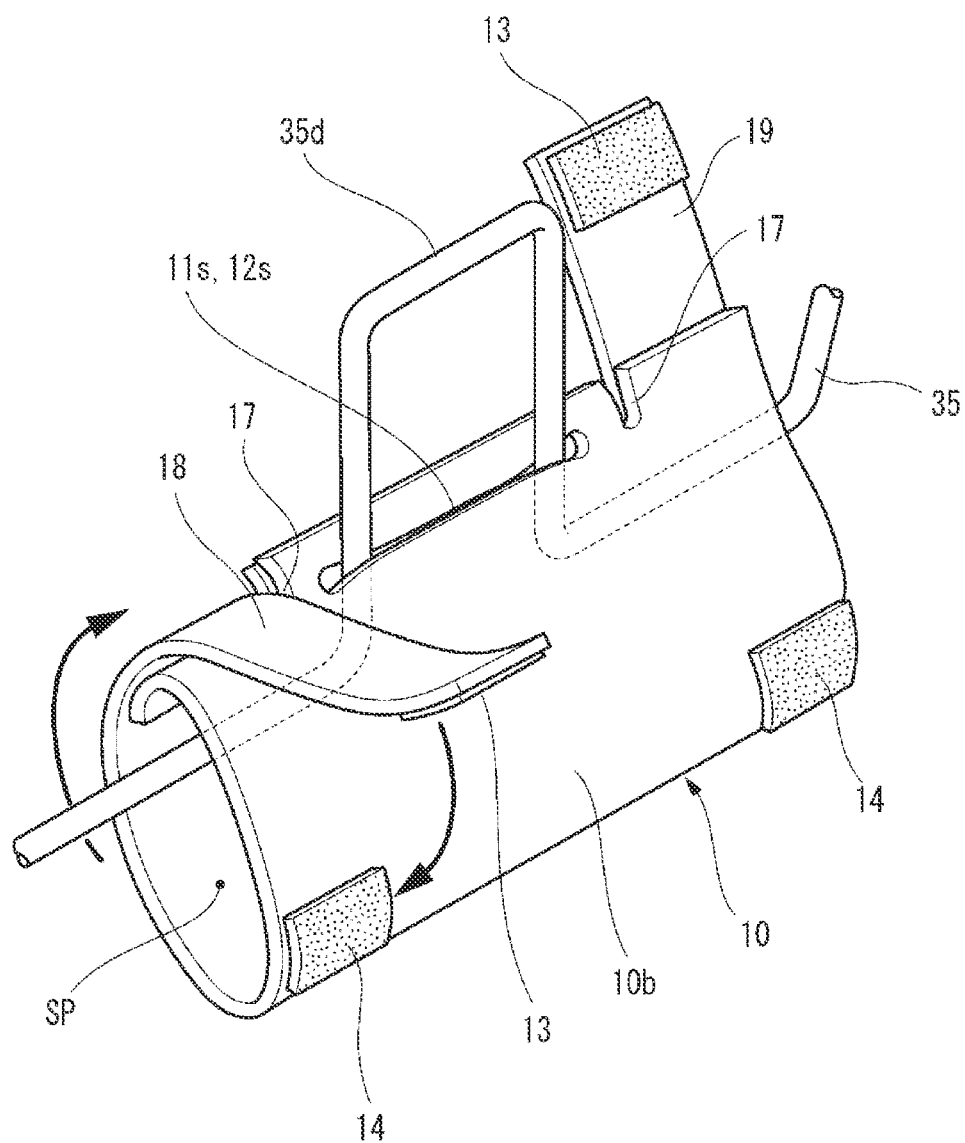
FIG. 7 is a perspective view showing an operation of winding a first extending portion around the sub-frame in a state where the wrapping member is held on the penetrating portion of the sub-frame.
Figure 8:
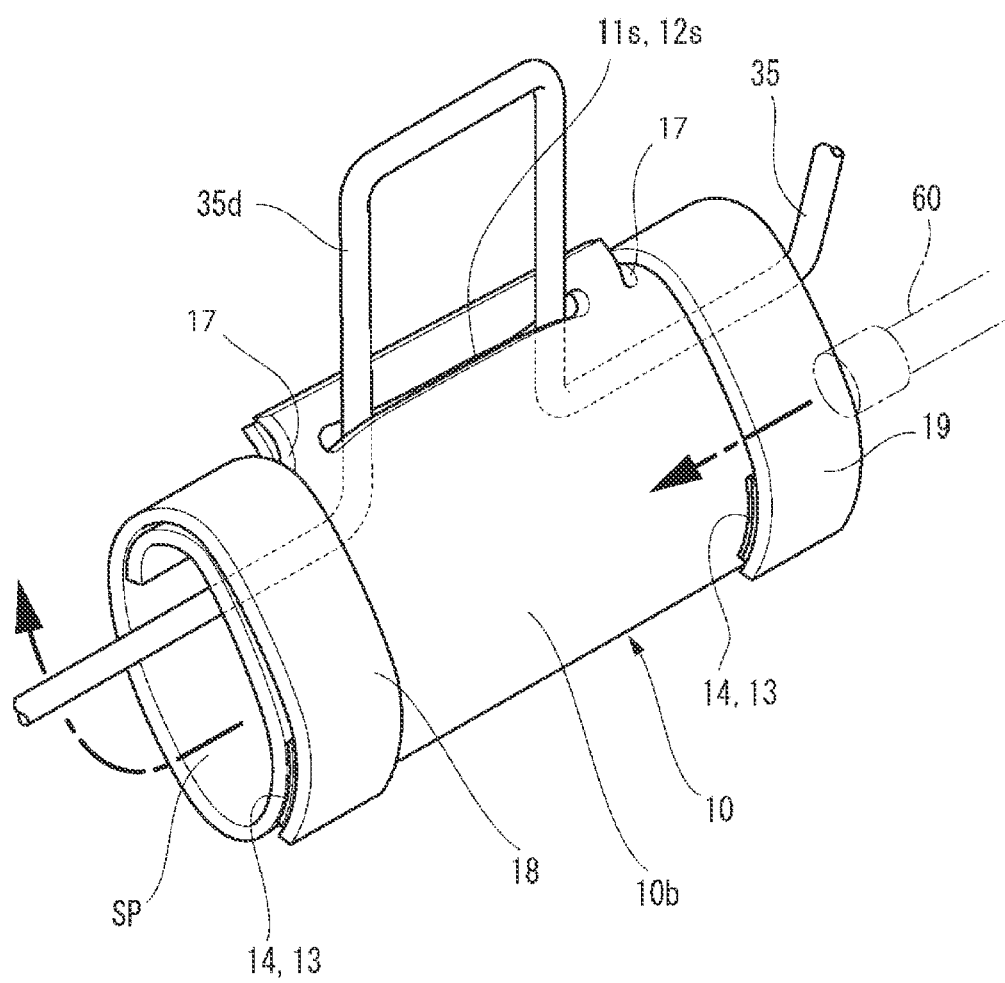
FIG. 8 is a perspective view showing a state where the first extending portion and a second extending portion of the wrapping member are wound around the sub-frame.
Figure 9:
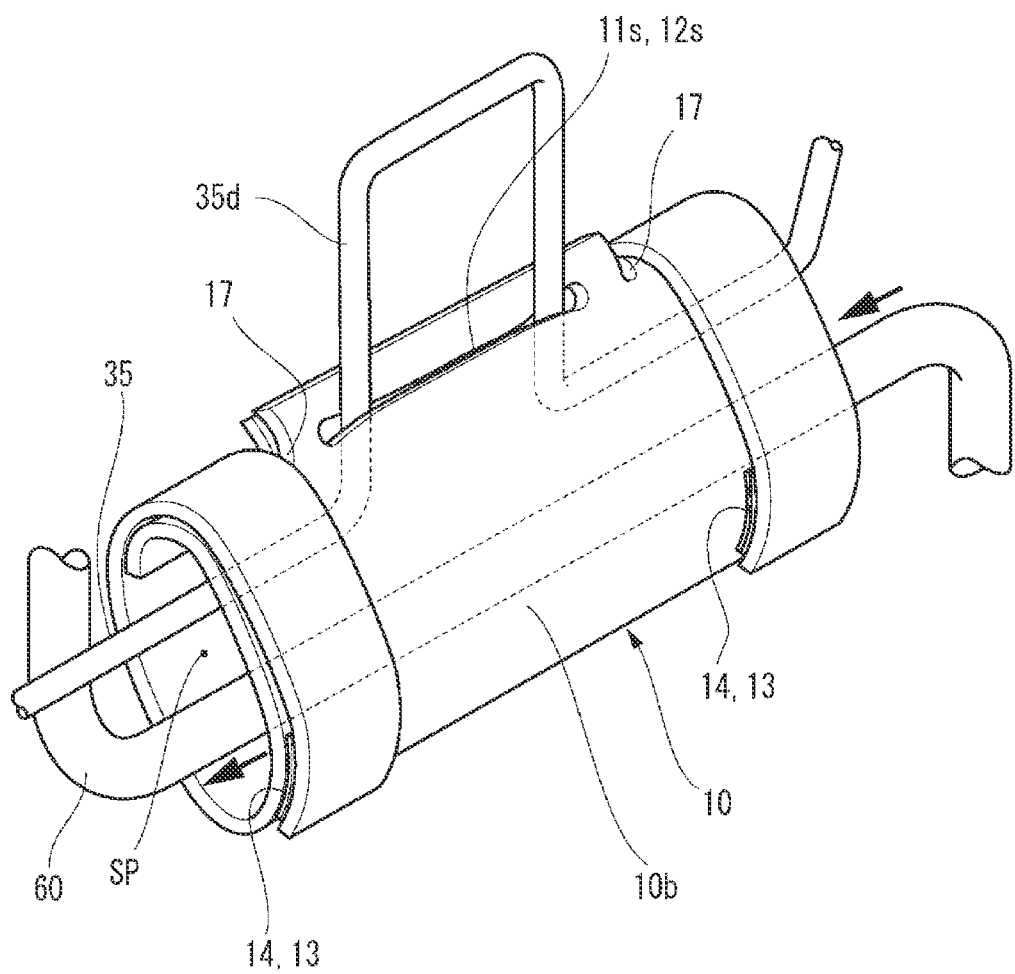
FIG. 9 is a perspective view showing a state where the wrapping member holds a wire harness.

FIG. 5 is a perspective view showing an attachment initial stage when the main body portion 10b of the wrapping member 10 is to be attached to the sub-frame 35 in a folded state. FIG. 6 is a perspective view showing a state where the wrapping member 10 is held on a penetrating portion 35d. FIG. 7 is a perspective view showing an operation of winding the first extending portion 18 around the sub-frame 35 in a state where the wrapping member 10 is held on the penetrating portion 35. FIG. 8 is a perspective view showing a state where the first extending portion 18 and the second extending portion 19 of the wrapping member 10 are wound around the sub-frame 35. FIG. 9 is a perspective view showing a state where the wrapping member 10 holds the wire harness 60.

When the wrapping member 10 is to be attached, first, the main body portion 10b is two-folded in a vicinity of the center line CL, and is two-folded such that the first slit 11s and the second slit 12s overlap each other at that time (with reference to FIG. 4). In the two-folded state, as shown in FIG. 5, the first slit 11s and the second slit 12s correspond to the penetrating portion 35d which is bent so as to protrude upward in the sub-frame 35, and the penetrating portion 35d is pushed into the first slit 11s and the second slit 12s. At this time, since the cuts 17 are provided on both sides of the first slit 11s and both sides of the second slit 12s, for example, the slit-forming portions can be bent by a hand, and it is easy to pass the first slit 11s and the second slit 12s through the penetrating portion 35d.

As shown in FIG. 6, the wrapping member 10 is locked and hooked such that the penetrating portion 35d penetrates the first slit 11s and the second slit 12s due to the pushing operation into the penetrating portion 35d. As a result, a position of the wrapping member 10 in the left-right direction is also regulated by the sub-frame 35, and a lower end side of the wrapping member 10 swells up slightly (an inner space slightly narrower than a holding space SP shown in FIG. 7 is formed). At this time, the locking portions 14 provided on the outer surface 10us are visible on the front side (seat rear side).

Next, as shown in FIG. 7, the first extending portion 18 and the second extending portion 19 are hooked to the sub-frame 35. That is, the first extending portion 18 and the second extending portion 19 are wound forward and upward from a rear side of the sub-frame 35. At this time, since the cuts 17 are provided, the first extending portion 18 and the second extending portion 19 can be easily retracted. Then, the first extending portion 18 and the second extending portion 19 are retracted, and the locking portions 13 on the tip ends of the first extending portion 18 and the second extending portion 19 are aligned with the locking portions 14 positioned on lower sides thereof so as to be brought into contact with and locked to the locking portions 14. As a result, the wrapping member 10 is brought into a state where linear portions of the sub-frame 35 on left and right sides of the penetrating portion 35d are accommodated in the holding space SP.

Thus, as shown in FIG. 8, the wrapping member 10 is fixed such that a central portion in the left-right direction is locked by the penetrating portion 35d and both left and right end sides are wound around the sub-frame 35. As a result, the holding space SP penetrating in the left-right direction is formed inside the wrapping member 10. Thereafter, for example, the wire harness 60 is inserted from one end side (right side in FIG. 8) of the holding space SP and drawn out to the other end side.

For example, a connector on a tip end of the wire harness 60 which is inserted through the holding space SP is connected to a connector on a headrest 50 side. As a result, as shown in FIG. 9, in a state where the wire harness 60 is held by the wrapping member 10 so as to extend along the sub-frame 35, one end side of the wire harness 60 extends to a seat right side and is routed downward along the right side frame 34, and the other end side of the wire harness 60 is routed upward toward the headrest 50. The wrapping member 10 is brought into a state of reliably receiving and holding weight of the wire harness 60, that is routed in the upper-lower direction, in the middle of a routing path in the upper-lower direction. Here, since the wrapping member 10 has flexibility and is in a state of hanging from the sub-frame 35, it can be said that it is easy for the wrapping member 10 to move in the front-rear direction and to absorb an impact.

As described above, according to the automobile seat 1, since the wire harness 60 is wrapped together with the sub-frame 35 by the wrapping member 10, a moving range of the wire harness 60 is regulated. Since the wrapping member 10 has flexibility, even when an impact is applied from the outside of the trim cover 30T to a position where the wrapping member 10 is disposed, the impact can be alleviated by the wrapping member 10 due to the flexibility, and safety can be improved.

Further, since the wrapping member 10 has flexibility, the wrapping member 10 can hold the wire harnesses 60 of various shapes. That is, the same wrapping member 10 can be used regardless of a type of the automobile seat 1, and the manufacturing cost of the automobile seat 1 can be lowered. Further, since the wrapping member 10 has flexibility, the wrapping member 10 can hold the wire harness 60 without damaging the wire harness 60.

Further, according to the automobile seat 1, by using the flexible wrapping member 10 as a member for holding the wire harness 60 in the seat back 30 to which an impact from the outside is particularly likely to be applied, a test related to the internal protrusion can be easily cleared, and the safety can be improved while lowering the manufacturing cost.

Further, according to the automobile seat 1, since the wrapping member 10 is supported on the sub-frame 35 in a state where the wrapping member 10 is passed through by the penetrating portion 35d, the position of the wrapping member 10 is reliably regulated such that the attachment position of the wrapping member 10 does not move with respect to the sub-frame 35. As a result, the wire harness 60 can be stably held. Further, the wrapping member 10 is supported such that the penetrating portion 35*d* penetrates the first slit 11*s* and the second slit 12*s* in a state where the first slit 11*s* and the second slit 12*s*, which are disposed apart from each other on the sheet-shaped main body portion 10*b*, overlap each other. Therefore, not only the wrapping member 10 is securely held, but also the holding space SP formed in the bent state of the wrapping member 10 is stably maintained. Further, since the wrapping member 10 can be in a temporarily fixed state such that the first slit 11*s* and the second slit 12*s* are penetrated and supported by the penetration portion 35*d* in the middle of the attachment, the attachment operability is also excellent.

Further, according to the automobile seat 1, the first extending portion 18 and the second extending portion 19 are configured such that the locking portions 13 provided on the tip ends of the first extending portion 18 and the second extending portion 19 can be locked to the locking portions 14 on the outer surface 10*us* of the main body portion 10*b*. Thus, both left and right ends of the main body portion 10*b* can be maintained in a bent state by the first extending portion 18 and the second extending portion 19. As a result, a space in which the wire harness 60 can be disposed is easily formed and maintained inside the main body portion 10*b*, and workability when the wire harness 60 is passed through the inside of the wrapping member 10 can be improved.

In addition, according to the automobile seat 1, the wrapping member 10 covers the wire harness 60 and a part of the sub-frame 35. Therefore, the wire harness 60 can be more reliably held by the wrapping member 10 and the attachment position of the wrapping member 10 can be further stabilized.

Figure 10:
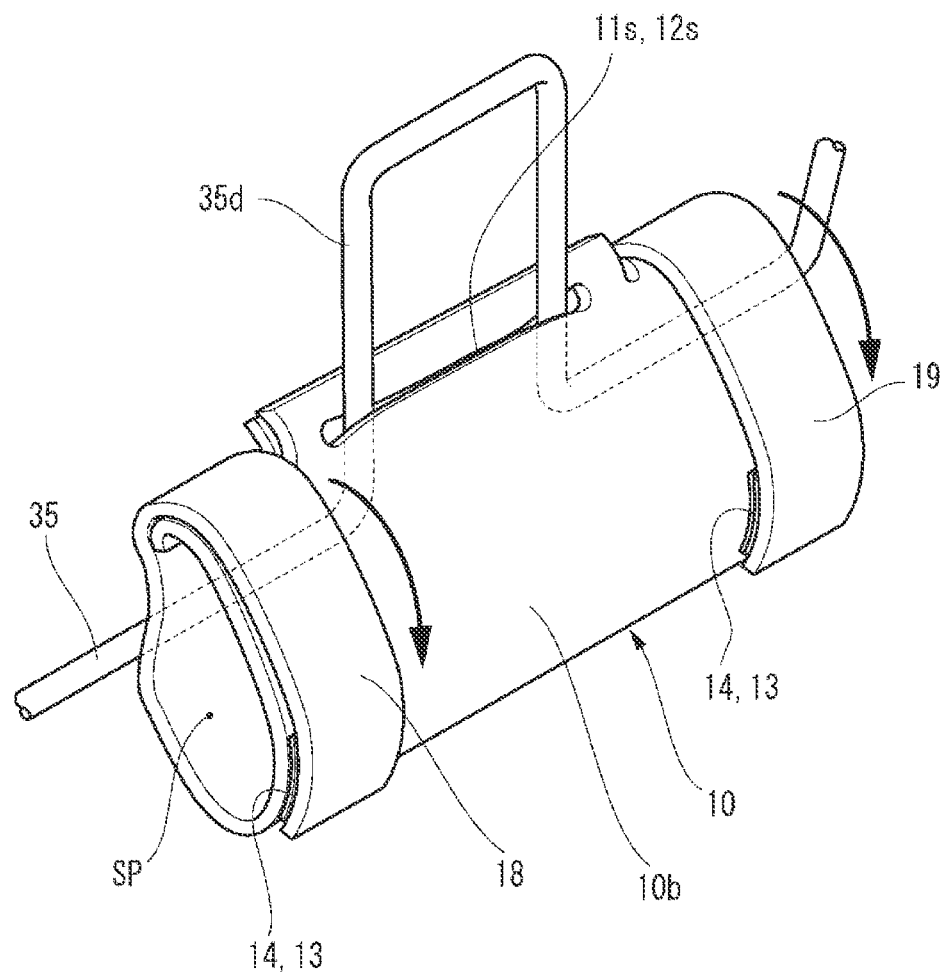
FIG. 10 is a perspective view showing a state where a wrapping member is attached to a sub-frame in a first modification of the automobile seat.
Figure 11:
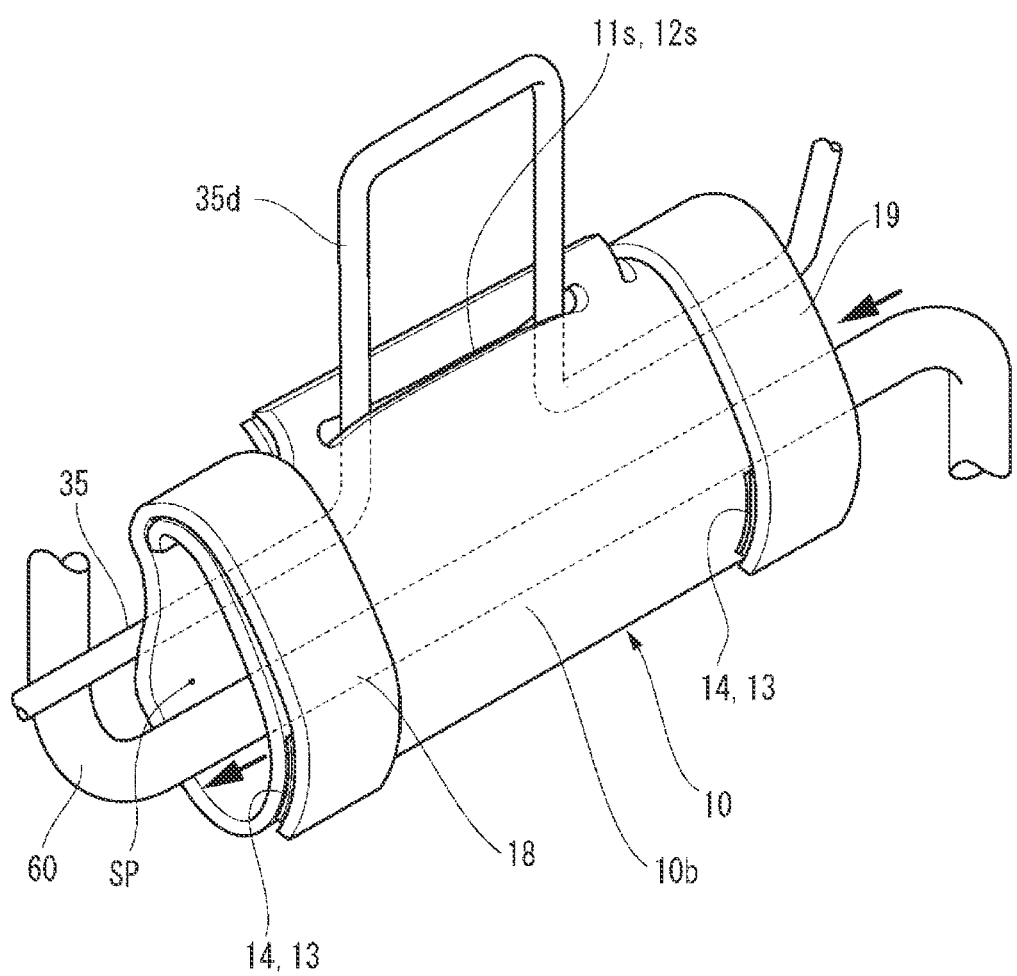
FIG. 11 is a perspective view showing a state where a wire harness is held by the wrapping member shown in FIG. 10.

Next, a first modification of the automobile seat 1 will be described with reference to FIGS. 10 and 11. FIG. 10 is a perspective view showing a state where the wrapping member 10 is held on the penetrating portion 35*d* in the first modification of the automobile seat 1. FIG. 11 is a perspective view showing a state where the wire harness 60 is held by the wrapping member 10. In the modification shown in FIGS. 10 and 11, the same components as those in FIG. 9 are denoted by the same reference numerals, and description thereof will be omitted.

The first modification shown in FIGS. 10 and 11 is the same as the configuration of FIG. 9 except that the first extending portion 18 and the second extending portion 19 are not attached so as to wrap around the sub-frame 35. In the first modification, the wrapping member 10 has exactly the same configuration as that described above, but the attachment form thereof is different. Specifically, when the wrapping member 10 is to be attached, the first extending portion 18 and the second extending portion 19 are bent rearward from the state shown in FIG. 6 without being wound around the sub-frame 35, and the locking portions 13 are overlapped with and locked to the locking portions 14. As a result, as shown in FIG. 10, the wrapping member 10 is locked to the penetrating portion 35*d* in a state where the sub-frame 35 is not accommodated in the holding space SP. The subsequent attachment operation of the wire harness 60 is the same as that described above, and the wire harness 60 is inserted into the holding space SP. As a result, as shown in FIG. 11, only the wire harness 60 is accommodated and held in the holding space SP.

In the first modification, when the holding space SP of the wrapping member 10 is formed, it is not necessary to hook the first extending portion 18 and the second extending portion 19 on the sub-frame 35, and the forming operation of the holding space SP is simpler. Further, the wrapping member 10 can be detached or moved from the penetrating portion 35*d* in a state where the wrapping member 10 holds the wire harness 60.

Figure 12:
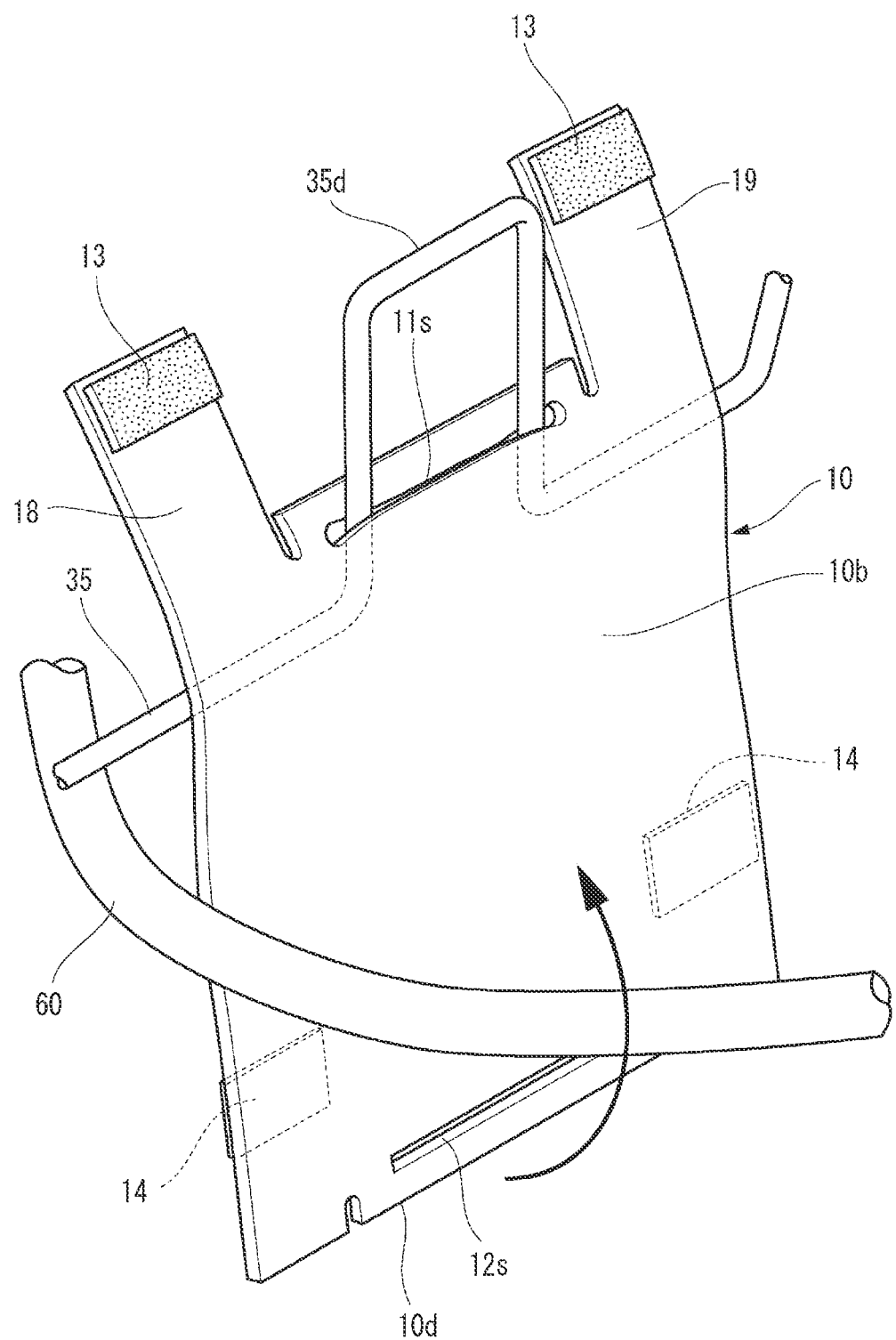
FIG. 12 is a perspective view showing a state where a wrapping member is being attached to a sub-frame in a second modification of the automobile seat.
Figure 13:
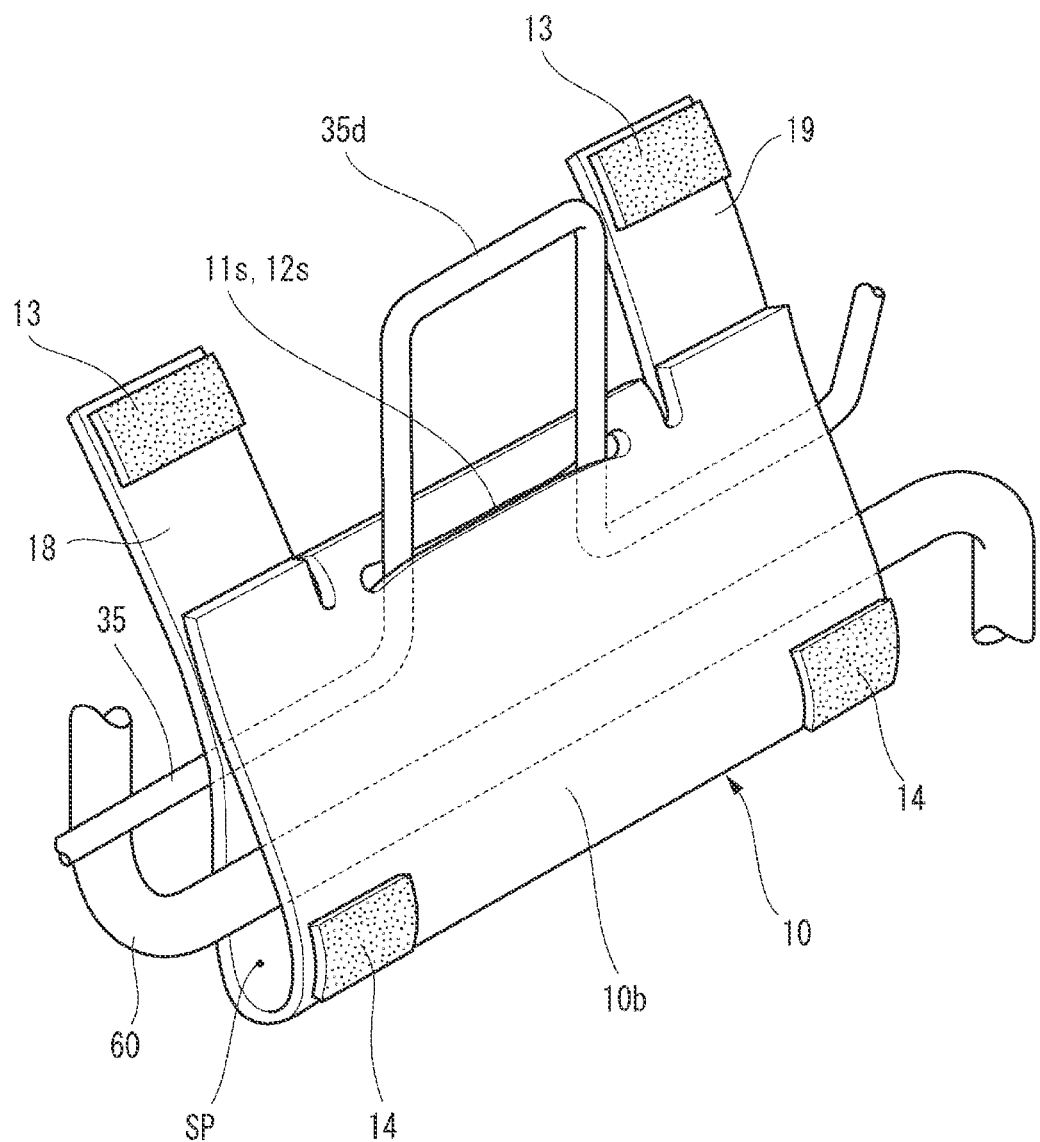
FIG. 13 is a perspective view showing a state in the middle of an operation of holding the wire harness by the wrapping member shown in FIG. 12.

Next, a second modification of the automobile seat 1 will be described with reference to FIGS. 12 and 13. FIG. 12 is a perspective view showing a state where the wrapping member 10 is being attached to the penetrating portion 35*d* in the second modification of the automobile seat 1. FIG. 13 is a perspective view showing a state in a middle stage of an operation of holding the wire harness 60 by the wrapping member 10 shown in FIG. 12. In the modifications shown in FIGS. 12 and 13, the same components as those in FIG. 9 are denoted by the same reference numerals, and description thereof will be omitted.

In the second modification shown in FIGS. 12 and 13, the wrapping member 10 has exactly same configuration as that described above, but an attachment procedure is largely different. Specifically, in the second modification, the wrapping member 10 is inserted into the penetrating portion 35*d* in a state where the wire harness 60 is connected in advance. At this time, as shown in FIG. 12, only the first slit 11*s* is inserted through the penetrating portion 35*d*, and the wire harness 60 is disposed behind the wrapping member 10. Thereafter, the lower end 10*d* is pulled up so as to wrap the wire harness 60 by the main body portion 10*b*, and further, as shown in FIG. 13, the second slit 12*s* is inserted into the penetrating portion 35*d*.

An operation after the state shown in FIG. 13 can be selected between that in a case where the first extending portion 18 and the second extending portion 19 are hooked on the sub-frame 35 (a form shown in FIG. 9) and that in a case where the first extending portion 18 and the second extending portion 19 are not hooked on the sub-frame 35 (a case in the first modification).

Thus, in the second modification, the wire harness 60 can be held even after the wire harness 60 is wired. Moreover, the holding state of the wire harness 60 can be freely selected as necessary.

Figure 14:
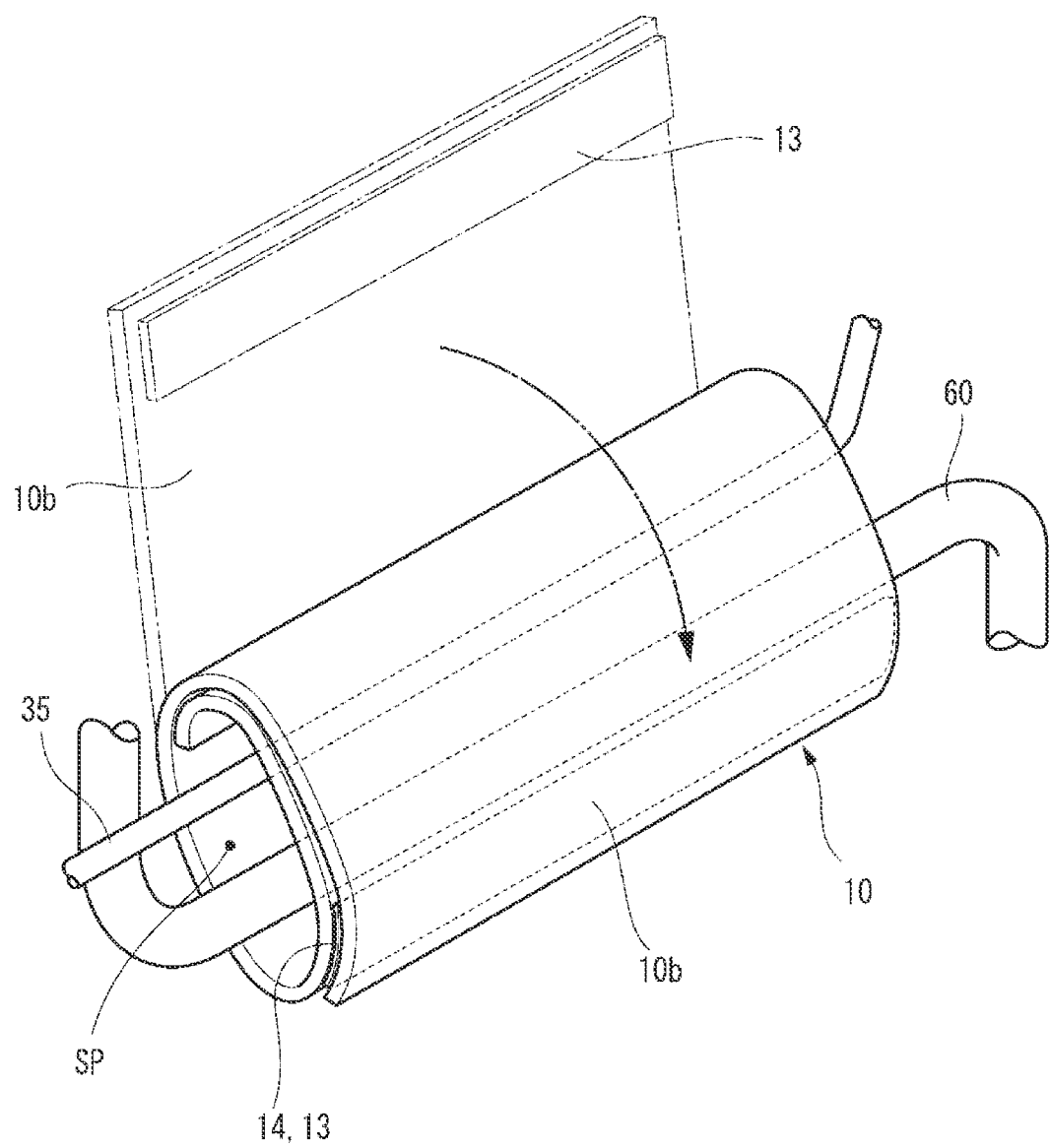
FIG. 14 is a perspective view showing a state where a wire harness is held by a wrapping member in a third modification of the automobile seat.

Next, a third modification of the automobile seat 1 will be described with reference to FIG. 14. FIG. 14 is a perspective view showing a state where the wire harness 60 is held by the wrapping member 10 in the third modification of the automobile seat 1. In the third modification shown in FIG. 14, the same components as those in FIG. 9 are denoted by the same reference numerals, and description thereof will be omitted.

In the third modification, a structure of the wrapping member 10 is different from that described above. Specifically, the wrapping member 10 according to the third modification has a rectangular overall shape. Further, the first slit 11*s* and the second slit 12*s* described above are not provided. Accordingly, as shown in FIG. 14, the wrapping member 10 has a simple configuration in which the locking portion 13 and the locking portion 14 are provided on front and back surfaces of a sheet-shaped member. That is, the locking portion 13 is provided on an inner surface side on one end of the wrapping member 10, and the locking portion 14 is provided on an outer surface side. Each of the locking portions 13, 14 may have a shape divided into a plurality of parts, or may have one long shape along one side of the wrapping member 10 as shown in FIG. 14.

As described above, since the wrapping member 10 according to the third modification does not have a slit structure, the wrapping member 10 can be attached to the sub-frame 35 at a place where the penetrating portion 35d is not provided.

In the third modification, it is not necessary to provide the first extending portion 18, the second extending portion 19, the first slit 11s, and the second slit 12s, and the shape is simple. Therefore, the wrapping member 10 is extremely easy to manufacture, and furthermore, a highly versatile wrapping member 10 can be provided without selecting an attachment location of the wrapping member 10.

The present invention is not limited to the embodiment and modifications described above and may be appropriately modified without departing from the scope of the present invention. For example, in the above description, the wrapping member 10 holds the wire harness 60 in the holding space SP formed by the main body portion 10b, but the present invention is not limited thereto. The wire harness 60 may be held in a space sandwiched between the outer surface of the main body portion 10b and inner surfaces of the first extending portion 18 and the second extending portion 19.

Further, in the above description, the wrapping member 10 is configured to be attached to the sub-frame 35 of the seat back frame 31, but the wrapping member 10 may be attached to another location of the seat back frame 31.

Further, although a hook-and-loop fastener is used as the locking portions 13, 14, the present invention is not limited thereto. For example, it is possible to employ various structures such as a hook metal fitting (a member referred to as a "hook" or the like) for stopping a seam of clothes or the like, an appropriately hook-shaped locking member for hooking and locking each other, or an adhesive tape.

In the above description, the automobile seat 1 mounted on the automobile is taken as an example of the vehicle seat. However, the present invention is not limited to a seat mounted on an automobile, and may be applied to a seat mounted on a vehicle such as a train, an aircraft, or a ship. Further, the wrapping member 10 is not limited to the use of holding the wire harness 60 incorporated in the seat back 30, and is also applicable to, for example, the use of holding the wire harness incorporated in the seat cushion 20.

As described above, the present description discloses the following matters.

Although the corresponding constituent elements or the like in the above embodiment are shown in parentheses, the present invention is not limited thereto.

(1) A vehicle seat (automobile seat 1) on which an occupant of a vehicle is seated, includes:
a cover (trim cover 30T) covering a seat frame (seat back frame 31);
a wire harness (wire harness 60) routed inside the cover; and
a flexible wrapping member (wrapping member 10) attached to the seat frame and wrapping a part of the wire harness.

(2) In the vehicle seat according to the above (1),
the seat frame is a seat back frame (seat back frame 31) configuring a framework of a seat back (seat back 30).

(3) In the vehicle seat according to the above (1) or (2),
the wrapping member includes a sheet-shaped main body portion (main body portion 10b) including a first slit (first slit 11s) and a second slit (second slit 12s) which are disposed apart from each other, and the main body portion is bent in a state where the first slit and the second slit overlap each other, the seat frame includes a penetrating portion (penetrating portion 35d) that penetrates the first slit and the second slit, the wrapping member is supported by the seat frame at the penetrating portion, and the part of the wire harness is disposed inside the bent main body portion.

(4) In the vehicle seat according to the above (3),
the main body portion includes an end portion closer to the first slit than the second slit,
the end portion has an first side portion on one end side in a direction along which the first slit extends and an second side portion on an another end side along the first slit,
the wrapping member includes a first extending portion (first extending portion 18) extending from the first side portion and a second extending portion (second extending portion 19) extending from the second side portion, and
the first extending portion and the second extending portion are configured to be locked to an outer surface of the bent main body portion.

(5) In the vehicle seat according to the above (4),
a part of the seat frame is further disposed inside the bent main body portion.

What is claimed is:

1. A vehicle seat on which an occupant of a vehicle is seated, comprising:
a cover covering a seat frame;
a wire harness routed inside the cover; and
a flexible wrapping member attached to the seat frame and wrapping a part of the wire harness inside the cover, wherein
the wrapping member includes a sheet-shaped main body portion including a first slit and a second slit which are disposed apart from each other, and the main body portion is bent in a state where the first slit and the second slit overlap each other,
the seat frame includes a penetrating portion that penetrates the first slit and the second slit,
the wrapping member is supported by the seat frame at the penetrating portion, and
the part of the wire harness is disposed inside the bent main body portion.

2. The vehicle seat according to claim 1, wherein
the seat frame is a seat back frame configuring a framework of a seat back.

3. The vehicle seat according to claim 1, wherein
the main body portion includes an end portion closer to the first slit than the second slit,
the end portion has a first side portion on one end side in a direction along which the first slit extends and an second side portion on an another end side along the first slit,
the wrapping member includes a first extending portion extending from the first side portion and a second extending portion extending from the second side portion, and
the first extending portion and the second extending portion are configured to be locked to an outer surface of the bent main body portion.

4. The vehicle seat according to claim 3, wherein
a part of the seat frame is further disposed inside the bent main body portion.

5. The vehicle seat according to claim 2, wherein
the main body portion includes an end portion closer to the first slit than the second slit,
the end portion has a first side portion on one end side in a direction along which the first slit extends and an second side portion on an another end side along the first slit, the wrapping member includes a first extending portion extending from the first side portion and a second extending portion extending from the second side portion, and the first extending portion and the second extending portion are configured to be locked to an outer surface of the bent main body portion.

6. The vehicle seat according to claim 5, wherein a part of the seat frame is further disposed inside the bent main body portion.

* * * * *